R. W. PITTMAN.
VEST POCKET FILM CAMERA.
APPLICATION FILED SEPT. 3, 1920.
1,430,582.
Patented Oct. 3, 1922.
2 SHEETS—SHEET 1.
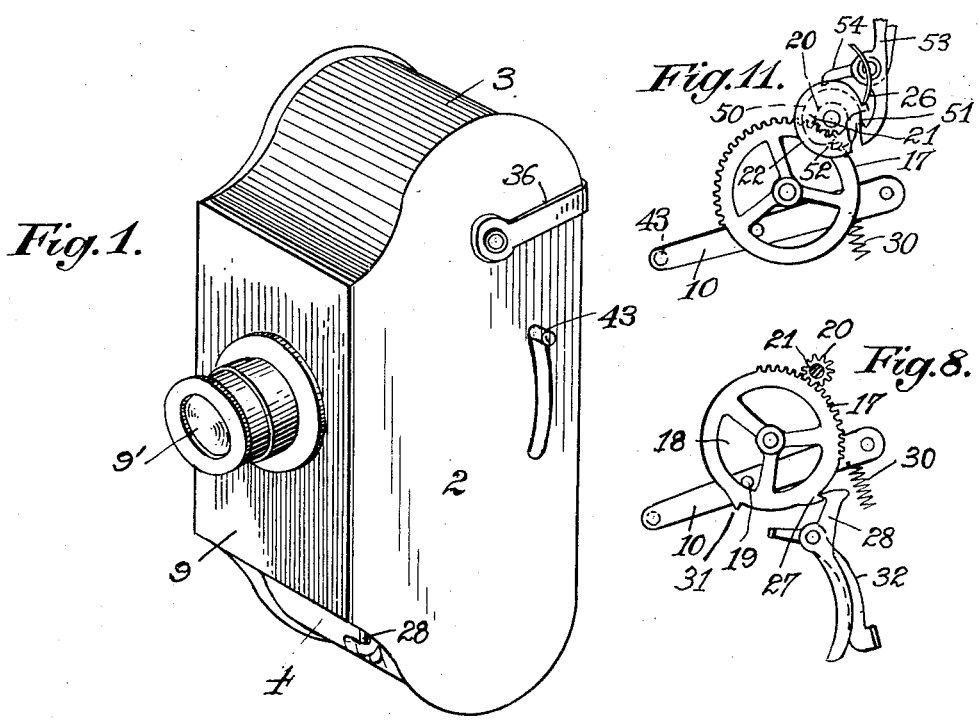
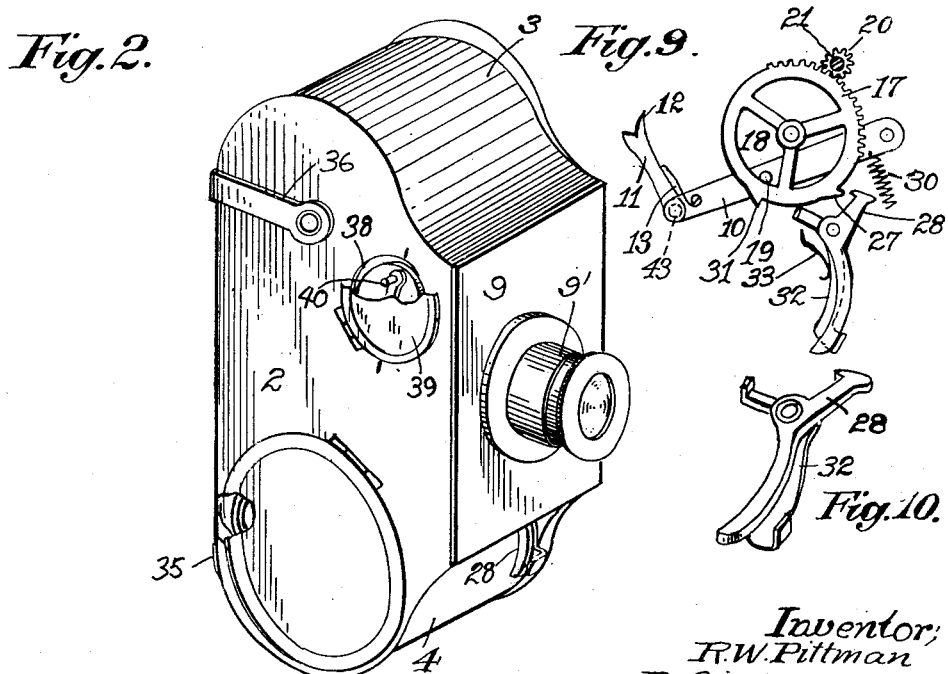
Inventor,
R. W. Pittman
By his Attorney
Wm H. Reid R. W. PITTMAN.
VEST POCKET FILM CAMERA.
APPLICATION FILED SEPT. 3, 1920.
1,430,582.
Patented Oct. 3, 1922.
2 SHEETS—SHEET 2.
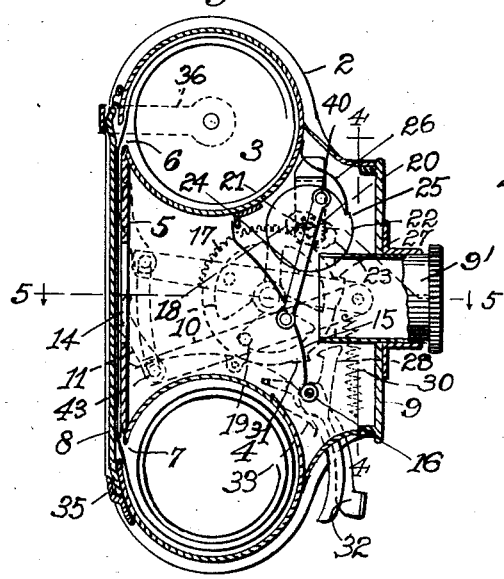
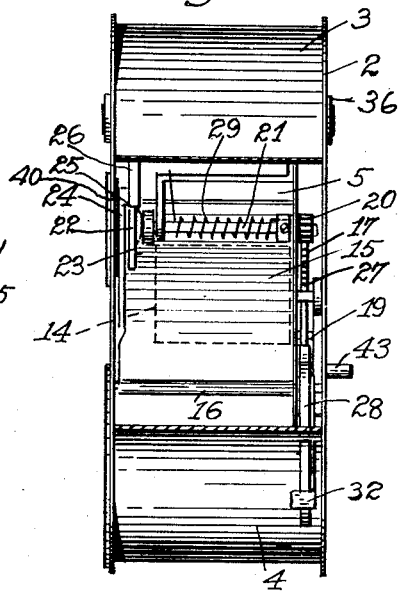
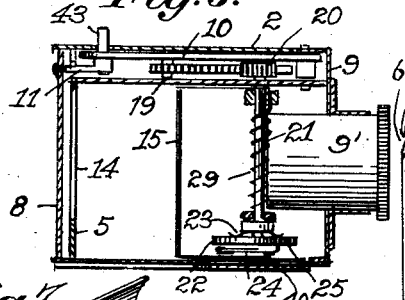
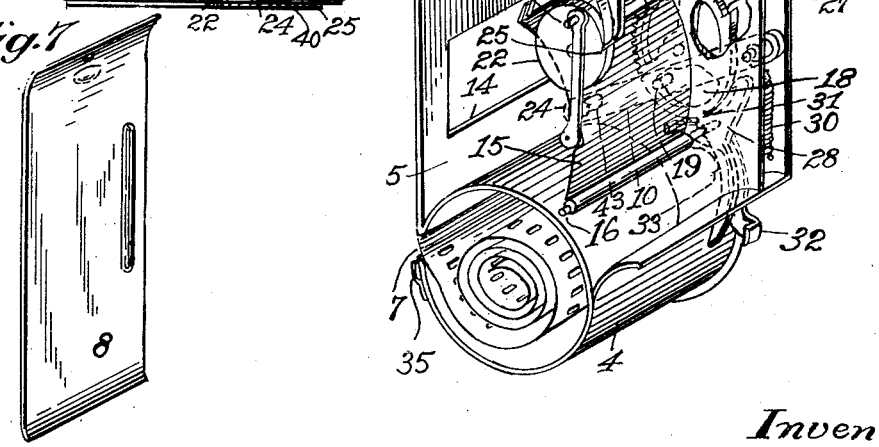
Inventor,
R. W. Pittman
By his Attorney
Wm. H. Reid.

Patented Oct. 3, 1922.

1,430,582

UNITED STATES PATENT OFFICE.

REINHART W. PITTMAN, OF NEW YORK, N. Y.

VEST-POCKET-FILM CAMERA.

Application filed September 3, 1920. Serial No. 407,888.

*To all whom it may concern:*

Be it known that I, REINHART W. PITTMAN, a citizen of the United States of America, and resident of New York, in the county of New York and State of New York, have invented certain new and useful Improvements in Vest-Pocket-Film Cameras, of which the following is a full, clear, and exact description.

This invention relates to cameras for holding a small roll of film that can be advanced across the lens of the camera and has for its object to provide a device that will engage the film between a pair of film chambers, to merely draw the film out of the supply chamber and advance it into the receiving chamber.

A further object of the invention is to provide in connection with the film feeding means, a shutter whose operating spring will be tensioned by the film feeding movement, so that a trip lever can release the tension shutter to expose the film.

A further object is to provide in connection with such mechanism, means for operating the tension shutter, to make a time exposure instead of a quick exposure.

In the accompanying drawing showing embodiments of my invention, Fig. 1 is a perspective view of the camera.

Fig. 2 shows the camera for use in projection.

Fig. 3 is a longitudinal section.

Fig. 4 is a section taken transverse to the latter section on the line 4—4 of Fig. 3.

Fig. 5 is a transverse section on the line 5—5 of Fig. 3.

Fig. 6 is a view of some of the parts with the casing omitted.

Fig. 7 shows one cover plate.

Fig. 8 shows the trip levers and gears.

Fig. 9 shows the same in advanced position.

Fig. 10 shows the trip levers.

Fig. 11 shows another form of trip device.

As shown in the drawings I provide a casing denoted generally by 2, having cylindrical chambers 3 and 4 at opposite curved ends of the casing. Between these chambers is a guide plate 5 extending between a slot 6 in the chamber 3, and a slot 7 in the chamber 4, and offset a short distance from the outer plate 8 of the casing, whereby to guide the film from the loading chamber 4 to the receiving chamber 3. The front plate 9 is shown provided with a lens $9^1$, and the inner plate 5 has a suitable aperture 14 to expose the film to the lens. In film cameras heretofore means have been provided in the receiving chamber to wind the film therein on a suitable spool. In the present arrangement the wound film is placed in one chamber and the end passed out through the slot, through the guide chamber between the plates 5 and 8, and the end passed through the slot 6 into the receiving chamber 3. A roll of film of this character will naturally have a tendency to wind itself up after being in a wound condition, and the advance of the film end portion into the receiving chamber, and continued advance of the film will cause the end to coil around in the receiving chamber, especially for a comparatively short length of film. I provide means for advancing the film between the guide plates, that will effect the feed and rewinding operation in the receiving chamber 3.

The standard film, especially motion picture film, is provided with a series of holes in the margins, and this film I employ for this camera, and simply engage the hole by a feeding member to advance the film between the guide plates. A lever 10 is pivoted in the casing at its middle portion, and has an arm 11 provided at one end with a pointed lug 12 that is pressed by a spring 13 against the film at its apertured margin, when the lever is swung. A pin 43 on the lever projects through a slot in the camera wall, whereby the operator can swing the lever. The arm will thus engage the film at an aperture and advance it a sufficient distance to bring the successive portions of the film, or images thereon, to the lens axis. Then the lever is retracted by spring 30.

Means are further provided to swing a shutter across the lens axis to close the opening 14 in the guide plate 5. A shutter 15 is hinged at 16 in the casing, and as shown in Figs. 3 and 6 will extend diagonally across between the lens and the said opening 14. On the side plate I mount a gear wheel 17, having an opening 18 into which projects a pin 19 on the lever 10. This gear meshes with a pinion 20 fast on a shaft 21, that carries a crank disc 22 loose thereon, to connect with the shaft by a spring washer 23 to be turned by friction when the gear turns the pinion. A rod 24 on the crank disc is pivoted to the shutter 15, and one rotation of the disc will cause the shutter to open and close. The disc has a notch 25 engaged by a spring arm 26 to prevent reverse turning of the disc. The gear 17 has a tooth 27 engaging a pawl 28, whose extremity projects through an aperture in the casing and forms a trip for the shutter mechanism. A coil spring 29 is arranged on the shaft 21 to tension the shaft. These parts are so constructed and arranged, that the swing of the lever 10 will advance the gear sufficient to rotate the pinion 20 a single revolution, and this will tension the coil spring. This turning of the gear 17 will cause its tooth 27 to engage the pawl 28 and lock the gear by the trip pawl in this position with the pinion shaft under tension. The crank disc 22 that has a friction engagement with the pinion shaft is prevented from turning during the said movement by reason of the arm 26 engaging its tooth 22, and hence the shutter will not operate during said feeding of the film and tensioning of the pinion shaft. The lever 10 is returned by a coil spring 30, and its pin 19 can swing free in the opening 18 in the gear, now held by the trip pawl. When it is desired to expose the film, the operator merely presses the trip pawl 28 that will release the gear and pinion, and the coil spring on the pinion shaft will cause it to rotate a single revolution. Its friction engagement with the crank disc 22 will carry the latter around for one revolution and oscillate the shutter.

When it is desired to operate the shutter to produce what is known as a time exposure, means must be provided to arrest the shutter in the open position, and then release it to close. I provide an additional trip in connection with the described operating means for the shutter by the pinion shaft and crank disc and gear wheel. The gear wheel 17 is provided with a second tooth 31 that is engaged by a second trip arm 32 pivoted on the trip arm 28 and having a friction connection therewith whereby the both arms will move together when either is pushed. Normally the second arm 32 is in the position shown in Figs. 8 and 10, and it will not engage the tooth 31. But when the arms are relatively shifted as shown in Fig. 9, and the arms are moved to release the tooth 27 from the arm 28, the arm 32 will be engaged by the second tooth 31, and this will arrest the shutter in the open position, the pinion having made a half revolution. As soon as the trip arms are released a spring 33 will shift the arms and release the second tooth on the gear, and the shutter will close.

When it is desired to use the camera for projecting purposes, the side plate 8 is removed, and another plate is substituted therefor. This plate is provided with a lamp casing that will project these rays through the opening 14 on the film, and the image will be projected by the lens 9.

When the camera is used for projection, it is desirable that the shutter remain in the open position and not be actuated by the means for advancing the film intermittently to bring successive images in the axis of exposure. To effect this result I turn the disc 25 through a half revolution, that is permitted by reason of this friction engagement with the pinion shaft. When the speed lever 10 is first operated to advance the firm, the gear 17 will rotate and be locked in the tensioned position, without disturbing the shutter as has been described. The spring 30 will return the lever 10 to its normal position. Therefore subsequent movement of the lever 10 will not disturb the gear 17, because the trip arms are not used for projection. To move the shutter to the open position, I provide an opening 38 that is normally closed by a swinging cover 39. When this is open the crank pin 40 on the disc, that engages the arm 24, is extended to be engaged by the operator to turn the disc a half revolution and the shutter will remain in the open position.

In Fig. 11 I show a modified form of control for the shutter. Instead of having two teeth on the gear 17, I place a disk 50 on the shaft 21, that has notches or teeth 51 and 52 in its edge. These are engaged by arms 53 and 54, corresponding to the arms or pawls 28 and 32, and operate in the same manner.

What I claim is:—

1. In a film camera, a casing, a lens, a film chamber, means to engage the film to advance it across the lens, a swinging shutter, a crank shaft connected with the shutter to cause it to open and close, a pinion on the crank shaft, a gear meshing with said pinion, a lever connected with the film advancing means, a pin on said lever engaging the gear wheel to turn the wheel on the full advance of the film sufficient to cause one rotation of the pinion and crank shaft to operate the shutter, a coil spring on the crank shaft to cause its rotation, a stop lever arranged to engage said gear wheel on its swing by the film lever in the advanced position of the gear, whereby the shaft is rotated to tension the spring, such shaft having a friction connection with the shutter, and a stop arm engaging the shaft to prevent rotation of the shutter connection when the gear is actuated by said lever to tension the shaft spring, but arranged to permit the shutter to act when the gear is released by said stop lever.

2. In a film camera, a casing, a lens, a film chamber, means to engage the film to advance it across the lens, a swinging shutter, a shaft, a coil spring on the shaft, a crank disk on the shaft having a friction connection therewith, an arm connecting the crank disk with said shutter, said crank disk having a notch, a spring pawl arranged to engage said notch to prevent reverse turning of the disk by the spring, a pinion on the shaft, a gear meshing with said pinion, a lever connected with the film advancing means, a pin on said lever engaging the gear to turn it on the full advance of the film to cause one rotation of the pinion and shaft to tension its spring, a stop lever arranged to engage said gear on its swing by the film lever to hold the gear and shaft under tension of the spring, but arranged to permit the shutter to act when the gear is released by said stop lever.

3. In a film camera, a casing, a lens, a film chamber, means to engage the film to advance it across the lens, a swinging shutter, a shaft, a coil spring on the shaft, a crank disk on the shaft having a friction connection therewith, an arm connecting the crank disk with said shutter, said crank disk having a notch, a spring pawl arranged to engage said notch to prevent reverse turning of the disk by the spring, a pinion on the shaft, a gear meshing with said pinion, a lever connected with the film advancing means, a pin on said lever engaging the gear to turn it on the full advance of the film to cause one rotation of the pinion and shaft to tension its spring, a stop lever arranged to engage said gear on its swing by the film lever to hold the gear and shaft under tension of the spring, but arranged to permit the shutter to act when the gear is released by said stop lever and a trip arranged to engage and hold the gear with the shutter in the open position when the gear has been released from said stop.

4. In a film camera, a casing, a lens, a film chamber, means to engage the film to advance it across the lens, a swinging shutter, a shaft, a coil spring on the shaft, a crank disk on the shaft having a friction connection therewith, an arm connecting the crank disk with said shutter, said crank disk having a notch, a spring pawl arranged to engage said notch to prevent reverse turning of the disk by the spring, a pinion on the shaft, a gear meshing with said pinion, a lever connected with the film advancing means, a pin on said lever engaging the gear to turn it on the full advance of the film to cause one rotation of the pinion and shaft to tension its spring, a stop lever arranged to engage said gear on its swing by the film lever to hold the gear and shaft under tension of the spring, but arranged to permit the shutter to act when the gear is released by said stop lever, said gear wheel having a second stop, and a trip arranged to engage the latter stop to hold the gear with the shutter in the open position when the gear has been released from said stop.

5. In a film camera, a casing, a lens, a film chamber, means to engage the film to advance it across the lens, a swinging shutter, a shaft connected with the shutter to cause it to open and close on one rotation, a lever connected with the film advancing means, a coil spring on the shaft to cause one rotation thereof, a stop lever arranged to engage the film lever whereby the shaft is held to tension the spring, but arranged to permit the shutter to act when released by the stop lever.

6. In a film camera, a casing, a lens, a film guide, means to engage the film to advance it across the lens, a shutter mounted to swing across the lens, a spring-controlled device operative to swing the shutter, means connecting the film-advancing means and the said spring device arranged to cause the feeding movement of the film to place the spring device under tension without moving the shutter, and a trip arranged to engage the spring device in its said tensioned position, whereby the spring device will be held tensioned until the trip is moved, whereupon the shutter will be operated by the spring device to move across the lens.

7. In a film camera, a casing, a lens, a film guide, means to engage the film to advance it across the lens, a shutter mounted to swing across the lens, a spring-controlled device operative to swing the shutter, means connecting the film-advancing means and the said spring device arranged to cause the feeding movement of the film to place the spring device under tension without moving the shutter, and a trip arranged to engage the spring device in its said tensioned position, whereby the spring device will be held tensioned until the trip is moved, whereupon the shutter will be operated by the spring device to move across the lens by a swinging movement, to expose and then cover the lens.

8. In a film camera, a casing, a lens, a film guide, means to engage the film to advance it across the lens, a shutter mounted to swing across the lens, a spring-controlled device operative to swing the shutter, means connecting the film-advancing means and the said spring device arranged to cause the feeding movement of the film to place the spring device under tension without moving the shutter, a trip arranged to engage the spring device in its said tensioned position, whereby the spring device will be held tensioned until the trip is moved, whereupon the shutter will be operated by the spring device to move across the lens by a swinging movement, to expose and then cover the lens, means for causing said trip to release the shutter and then to arrest it in the open position, and means for releasing the shutter from said open position and permit it to close.

9. In a film camera, a casing, a lens, a film guide, means to engage the film to advance it across the lens, a shutter mounted to move across the lens, a rotary member connected with the shutter, a spring shaft having a friction connection with the rotary member, a pawl connected with the rotary member to prevent its reverse movement, means connecting the spring shaft with the film-advancing means to place the shaft under tension without moving the rotary member, and a trip device arranged to hold the spring shaft under tension, whereby its release will cause rotation of the spring shaft and also of the rotary member to effect movement of the shutter.

10. In a film camera, a casing, a lens, a film guide, means to engage the film to advance it across the lens, a shutter mounted to swing across the lens, a rotary member connected with the shutter, a spring shaft having a friction connection with the rotary member, a pawl connected with the rotary member to prevent its reverse movement, means connecting the spring shaft with the film-advancing means to place the shaft under tension without moving the rotary member, and a trip device arranged to hold the spring shaft under tension, whereby its release will cause rotation of the spring shaft and also of the rotary member to effect swinging of the shutter across the lens.

11. In a film camera, a casing, a lens, a shutter mounted to move across the lens, a spring-controlled device operative to swing the shutter, a rotary member connected with the shutter, a spring shaft having a friction connection with the rotary member, a pawl connected with the rotary member to prevent its reverse movement, actuating means for the spring shaft arranged to place the shaft under tension without moving the rotary member, and a trip device arranged to hold the spring shaft under tension, whereby its release will cause rotation of the spring shaft and also of the rotary member to effect movement of the shutter.

12. In a film camera, a casing, a lens, a shutter mounted to move across the lens, a spring controlled device operative to swing the shutter, a rotary member connected with the shutter, a spring shaft having a friction connection with the rotary member, a pawl connected with the rotary member to prevent its reverse movement, actuating means for the spring shaft arranged to place the shaft under tension without moving the rotary member, a trip device arranged to hold the spring shaft under tension, whereby its release will cause rotation of the spring shaft and also of the rotary member to effect movement of the shutter, means for causing said trip to release the shutter and then to arrest it in the open position, and means for releasing the shutter from said open position and permit it to close.

Signed at New York city, N. Y., on August 31, 1920.

REINHART W. PITTMAN.